United States Patent [19]
Ekman

[11] Patent Number: 4,647,014
[45] Date of Patent: Mar. 3, 1987

[54] DEVICE OF THE KIND COMPRISING TWO TELESCOPICALLY COORDINATED MEMBERS

[76] Inventor: Jan Ekman, Järvstabyn 66, S-802 48 Gävle, Sweden

[21] Appl. No.: 730,774

[22] Filed: May 3, 1985

[30] Foreign Application Priority Data

May 7, 1984 [SE] Sweden ................................ 8402447

[51] Int. Cl.$^4$ .......................... B66D 1/36; B66D 3/16; B66F 3/44; F16H 27/02
[52] U.S. Cl. .................................... 254/221; 74/89.2; 254/242; 254/334; 254/358; 254/387
[58] Field of Search .............. 254/213, 221, 227, 242, 254/266, 334, 358, 362, 372, 387; 74/89.2, 89.21, 89.22

[56] References Cited

U.S. PATENT DOCUMENTS

| | | | |
|---|---|---|---|
| 191,619 | 6/1877 | Slaton | 254/387 |
| 1,861,191 | 5/1932 | Russell | 254/387 X |
| 2,352,678 | 7/1944 | Angell | 254/387 X |
| 2,661,816 | 12/1953 | Hulsart | 254/387 X |
| 3,337,187 | 8/1967 | Sumner | 254/387 |
| 3,745,725 | 7/1973 | Boucaud | 254/387 X |
| 3,891,184 | 6/1975 | Fields | 254/387 X |

FOREIGN PATENT DOCUMENTS 565437 11/1932 Fed. Rep. of Germany ...... 254/387

*Primary Examiner*—Stuart S. Levy
*Assistant Examiner*—Joseph J. Hail, III
*Attorney, Agent, or Firm*—Zarley, McKee, Thomte, Voorhees & Sease

[57] ABSTRACT

A telescopic device with two telescopic members (1, 2) comprises a control means with a flexible transmission element (4) for bringing the telescopic members in relative movement. The transmission element (10) is in engagement with a driving wheel (5), which is fixed relative to one (1) of the telescopic members in that the driving wheel is journalled at a base part (3) attached to said one telescopic member and from which the transmission element extends in a loop, which is arranged about a diverting wheel (8) arranged within a space limited by the telescopic members. The diverting wheel (8) is likewise fastened relative to the first telescopic member (1). The second telescopic member (2) is connected to a part (10) of the transmission element which extends between the driving member (5) and the diverting member (8), whereby thus a rotation of the driving member in a first direction causes contraction of the telescopic members while a rotation of the driving wheel in a second direction causes extension of the telescopic members.

9 Claims, 4 Drawing Figures

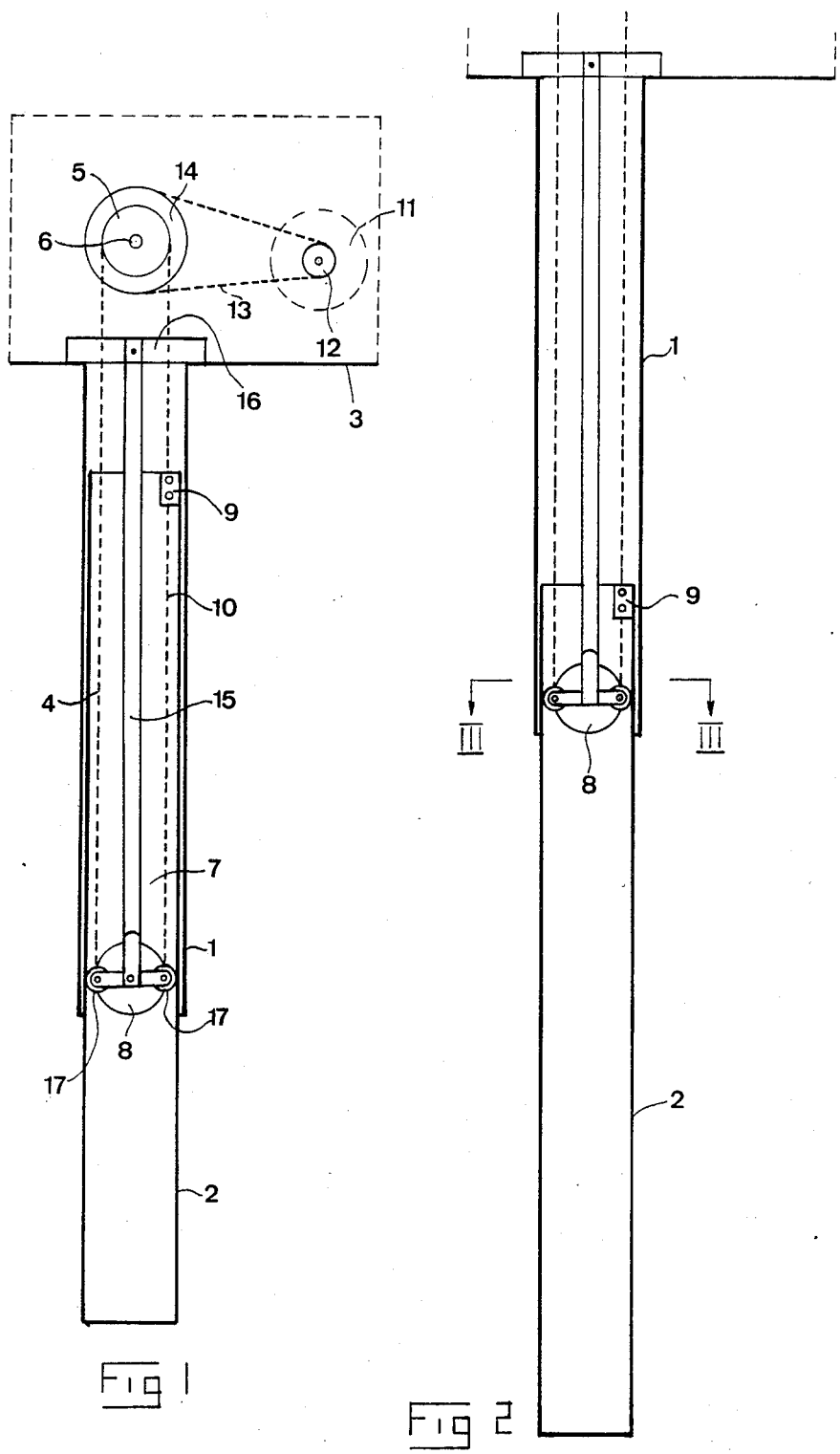

DEVICE OF THE KIND COMPRISING TWO TELESCOPICALLY COORDINATED MEMBERS

FIELD OF INVENTION AND PRIOR ART

This invention relates to a device of the kind which comprises two telescopically co-ordinated, at least partly hollow members, and a control means including a flexible transmission element to bring the telescopic members in a relative mevement.

Known telescopic devices of the kind defined in the introduction possess the drawback that they, for obtaining satisfactory operation, have been relatively complicated with comprehensive arrangements of diverting wheels etc. for guiding the transmission element in such directions that the desired relative movement between the telescopic members may be reached.

BRIEF DESCRIPTION OF THE INVENTION

The object of this invention is to achieve control means for a device of the kind mentioned in the introduction, which with a construction as simple and robust as possible will enable guided movement of the telescopic members for contraction as well as for extension of the telescopic device.

According to the invention this object is acheived in that the transmission element is in engagement with a rotatable driving member, such as a wheel or a drum connected to a first of the telescopic members or a part connected thereto, said transmission element extending from said driving member in a loop, which is arranged about a diverting member positioned within a space defined by the telescopic members, said diverting member being likewise connected to said first of the telescopic members or the part connected thereto, and that the second of the telescopic members is connected to a part of the transmission element which extends between the driving member and the diverting member, whereby a rotation of the driving member in a first direction causes contraction of the telescopic members while a rotation of the driving member in the other direction causes extension of the telescopic members.

Further advantageous characteristics of the invention appear from the dependent patent claims.

BRIEF DESCRIPTION OF DRAWINGS

Referring to the appended drawings, below follows a closer description of an embodiment of the invention cited as an example.

In the drawings:

FIG. 1 is a diagrammatic, partly cut view from the side of the telescopic device according to the invention, in a contracted condition, FIG. 2 is a view corresponding to FIG. 1 but showing the telescopic members in an extended condition.

DETAILED DESCRIPTION OF PREFERRED EMBODIMENTS OF THE INVENTION

Figure 3:
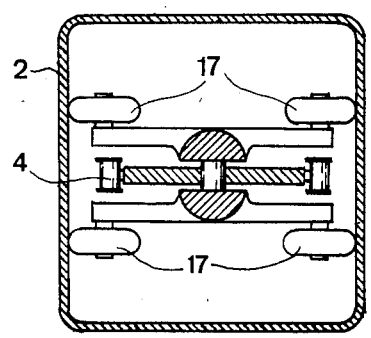
FIG. 3 is a cross section along the line III—III in FIG. 2.

The device illustrated in the drawings comprises two telescopically co-ordinate, at least partly hollow members 1 and 2. The members are preferably tube shaped along their whole length, and the cross section shape is arbitrary; in the example is illustrated, in cross section, an essentially rectangular configuration of the members.

A first 1 of the members is fixed at a base part 3. This base part 3 may be designed for stationary arrangement but it can also be made movable in itself. As an example the base part 3 could be fixed to a transporting device so that the base part 3 could be transported in the horizontal plane while the telescopic members 1 and 2 were relatively movable in the vertical plane. The device according to the invention is generally intended to be used in such a way that the outer end of the telescopic member 2, via some sort of fastening device, may carry all kinds of loads. It should be noted that the illustrated vertical arrangement of the members 1 and 2 only is to be considered as an example. The device may just as well be orientated so that the members 1 and 2 move horizontally relative to each other.

To bring the telescopic members 1 and 2 in relative movement there is a control means, which comprises a flexible transmission element 4 defined with a dashed line in FIGS. 1 and 2. This element is in engagement with a rotatable driving member 5, which is mounted in bearings about an axle 6 fixed at the base part 3. The transmission element extends from the driving member 5 in a loop which is arranged about a diverting member 8 positioned within a space 7 limited by the telescopic members. The diverting member is also connected to the base part 3. The telescopic member 2 is at 9 connected to a part 10 of the element 4 which extends between the driving member and the diverting member, whereby thus a rotation of the driving member 5 in a first direction (anti-clockwise) causes contraction of the telescopic members while rotation of the driving member in the other direction (clockwise) causes extension of the telescopic members.

It is preferred that the transmission element is constituted of an endless chain arranged in a ring shaped loop, while the driving member 5 and the diverting member 8 are constituted of chain wheels. However, as an alternative hereto the transmission element could be constituted of a wire or rope and the driving member 5 of a wire or rope drum about which end portions of the wire or rope are wound a few turns so that the wire or rope loop coming from the drum may be arranged about the diverting member 8, which in such a case is designed as a wire or rope wheel. Moreover it is possible to constitute the driving member of two separate wheels or drums, which each are in engagement with an end portion of the transmission element.

In the example the driving member 5 is drivable by a motor 11 via a transmission, which comprises a wheel 12 arranged on the outgoing axle of the motor, a further wheel 14 arranged on the axle 6 carrying the driving member 5 and a flexible transmission element 13 arranged about said wheels 12 and 14. It is also preferred that the element 13 is a chain while the wheels 12 and 14 are chain wheels. The motor is fixed to the base part 3.

It is preferred that the diverting member 8 is arranged in the proximity of the outer end of the first telescopic member 1, i.e. the end facing away from the base part 3. The telescopic member 2 is received within the member 1. The diverting member 8 is carried by a carrying member 15 extending along the space 7 within the telescopic members. The carrying member 15 is via a fastening member 16 fastened to the base part 3 at the end opposite the outer end of the member 1. As an alternative the fastening member 16 could be fastened to the member 1 at its end existing in the proximity of the base part 3. The carrying member 15 also carries one or several support members 17 for supporting engagement against the inside of the telescopic member 2. Although these support members may be constituted as sliding members it is an alternative to constitute them as wheels, rolls or the like, which will roll with a low friction against the inside of the member 2. Thereby at least two wheels should be arranged for supporting against different, opposite portions of the inside of the member 2. As appears from the cross section view in FIG. 3 it is possible to arrange four wheels 17, which are arranged in pairs on opposite sides of the diverting member 8. In the alternative embodiment in FIG. 4 there are also four wheels but they are arranged to roll against the area of the slightly rounded corners of the, in cross section, rectangular telescopic member 2.

The support members 17 are preferably arranged to support against the inside of the telescopic member 2 at a position where the two telescopic members, during normal operation, always are arranged to be positioned in a mutually overlapping relation. This is advantageous since the inner telescopic member 2 at this place receives good guiding support from the outer telescopic member 1. Thus, when the diverting member 8 is located in the area of the outer end of the telescopic member 1, the connection 9 between the element part 10 and the telescopic member 2 may be moved along the major part of the length of the telescopic member 1 so that a desired maximum extension of the telescopic member 2 is obtained.

It is preferred that support members analogous with the illustrated support members 17 are arranged at least at the outer end of the carrying member 15, i.e. in the area of the diverting member 8. However, demand for support of the carrying member 15 in the area between its ends may arise and in such a case further support members could be arranged on the support member 15 or alternatively on any of or both the telescopic members 1 and 2. Especially when orientating the telescopic members for relative movement in the horizontal direction or extension of the telescopic member 2 in a direction upwardly from the telescopic member 1, the loads on the diverting member 8 and thereby on the carrying member 15 can be so powerful that such additional support members are necessary for avoiding breaking of the carrying member 15.

Figure 4:
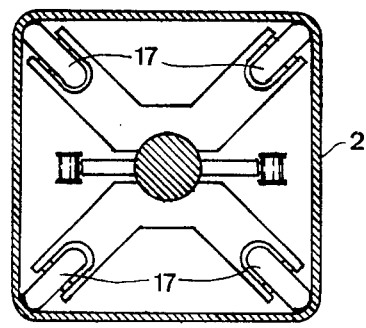
FIG. 4 is a view similar to FIG. 3 but illustrating an alternative embodiment.

It is obvious that the support members firstly must be constituted to support the carrying member perpendicular to the length direction of the carrying member and parallel to the plane for the path of movement of the transmission element about the diverting member 8, which is obtained in the embodiment according to FIG. 3. In the embodiment according to FIG. 4 the carrying member is supported in all directions perpendicular to its length direction.

In using the device according to the invention the telescopic members 1 and 2 may be extended by rotating the driving member 5 clockwise by means of the motor. The telescopic member 2 will thus be telescoped out of the telescope member 1 as a consequence of the connection point 9 being allowed/brought to approach the diverting member 8, at the same time as the support members 17 roll against the inside of the telescopic member 2. In rotation of the driving member 5 in a direction anti-clockwise, the connection point 9 will be drawn upwardly so that the telescopic member 2 is telescoped into the telescopic member 1 while the support members 17 also here roll against the inside of the telescopic member 2.

The invention is of course not limited only to the described embodiment but many modifications are possible within the frame of the spirit of the invention.

I claim:

1. A telescoping device comprising:
   first and second elongated tubular members telescopically mounted together and each having opposite first and second ends;
   control means for telescopically moving said first and second tubular members with respect to one another;
   said control means including a rotatable drive means secured with respect to said first tubular member, an elongated rigid carrying member extending longitudinally and concentric within said first and second tubular members and having a first end secured relative to said first tubular member and a spaced apart second end being positioned within said first and second tubular members, a diverting member secured to said second end of said carrying member, and a flexible transmission element trained about said diverting member and said drive means to form an endless loop, said second tubular member being connected to said transmission element at a location intermediate said diverting member and said drive means whereby rotation of said drive means in one direction causes telescopic contraction of said first and second tubular members relative to one another and rotation of said drive means on the opposite direction causes telescopc extension of said first and second tubular members relative to one another.

2. A device according to claim 1 wherein the transmission element constitutes a chain while the drive means and the diverting member constitute chain wheels.

3. A device acording to claim 1 wherein the diverting member is arranged in the proximity of the second end of the first tubular member.

4. A device according to claim 1 wherein the carrying member also carries at least one support member mounted within said first and second tubular members for supporting engagement against the inside wall of the second tubular member.

5. A device according to claim 4 wherein said support member includes rotatable wheels for rollably engaging the inside wall of the second tubular member.

6. A device according to claim 4 wherein the support member is arranged to support against the inside wall of the second tubular member at a place where the two first and second tubular members, during normal operation, always are arranged to be positioned in a mutually overlapping relation.

7. A device of the kind comprising two telescopically coordinated hollow members having a circumferentially closed tubular shape and control means including a flexible transmission element to bring the telescopic members in a relative movement, a first of the telescopic members being at one end thereof attached to a base part and the second of the telescopic members being received internally within said first telescopic member, the transmission element being in engagement with a rotatable driving member such as wheel or a drum, secured relative to the first telescopic member and the base part, said transmission element extending from said driving member in a loop, which is arranged about a diverting member positioned within a tubular space defined by the telescopic members, said diverting member being likewise secured relative to said first telescopic member and the base part by means of a longish carrying member extending longitudinally along the space and concentric within the telescopic members and being at one end thereof attached to the diverting member and at the other end thereof relative to the first telescopic member and to the base part adjacent said one end of the first telescopic member, said carrying member also carrying one or more support members for supporting engagement against the inside of the second telescopic member at a place where the two telescopic members, during normal operation, always are arranged to be positioned in a mutually overlapping relation, said diverging member being arranged in the proximity of the outer end of the first telescopic member and said second inner telescopic member being connected to a part of the transmission element which extends between the driving member and the diverging member, said second tubular member being connected to said transmission element whereby a rotation of the driving member in a first direction cuases contraction of the telescopic members while a rotation of the driving member in the other direction causes extension of the telescopic members.

8. A device according to claim 7 wherein the transmission element is constituted of a chain while the driving member and the diverging member are constituted of chain wheels.

9. A device according to claim 9 wherein said support members are constituted of wheels, rolls or the like, and at least two support members are arranged for supporting against different opposite portions of the inside of the second telescopic member.

* * * * *